United States Patent
Awasaka et al.

(10) Patent No.: US 6,817,349 B2
(45) Date of Patent: Nov. 16, 2004

(54) CONTROL SYSTEM AND METHOD AND ENGINE CONTROL UNIT FOR COMPRESSION IGNITION INTERNAL COMBUSTION ENGINE

(75) Inventors: Moriyoshi Awasaka, Saitama-ken (JP); Takashi Kakinuma, Saitama-ken (JP); Junji Yasuda, Saitama-ken (JP); Yasuhiro Urata, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/614,085

(22) Filed: Jul. 8, 2003

(65) Prior Publication Data

US 2004/0118390 A1 Jun. 24, 2004

(30) Foreign Application Priority Data

Jul. 8, 2002 (JP) ........................................ 2002-198444

(51) Int. Cl.[7] .............................................. F02B 11/00
(52) U.S. Cl. ........................... 123/564; 60/601; 60/608; 123/565
(58) Field of Search .................... 60/600, 601, 607, 60/608; 123/564, 565

(56) References Cited

U.S. PATENT DOCUMENTS

| | | | | |
|---|---|---|---|---|
| 4,428,352 A | * | 1/1984 | Mayer et al. ............... | 123/564 |
| 5,297,532 A | * | 3/1994 | Ikebe et al. ................. | 123/564 |
| 5,307,783 A | * | 5/1994 | Satoya et al. ............... | 123/564 |
| 5,345,920 A | * | 9/1994 | Sugino et al. .............. | 123/564 |
| 6,058,708 A | * | 5/2000 | Heinitz et al. ............... | 60/602 |
| 6,626,164 B2 | * | 9/2003 | Hitomi et al. .............. | 123/679 |
| 6,651,432 B1 | * | 11/2003 | Gray, Jr. ...................... | 123/564 |
| 6,684,863 B2 | * | 2/2004 | Dixon et al. ................ | 123/565 |

FOREIGN PATENT DOCUMENTS

JP          10266878 A    * 10/1998    ........... F02D/13/02

* cited by examiner

*Primary Examiner*—Sheldon J Richter
(74) *Attorney, Agent, or Firm*—Arent Fox, PLLC (57) ABSTRACT

A control system for a compression ignition internal combustion engine is provided which is capable of expanding a region for executing compression ignition, on the low-load side, while positively obtaining a required power output from the engine. The amount of residual combustion gas is determined depending on operating conditions of the engine, and based on the determined amount of residual combustion gas, part of combustion gas is retained in each combustion chamber after combustion. It is judged whether or not supercharging of fresh air should be executed for self-ignition, based on the operating conditions of the engine, and when it is judged that the supercharging should be executed, supercharging of fresh air flowing to the combustion chamber is executed.

15 Claims, 11 Drawing Sheets

CONTROL SYSTEM AND METHOD AND ENGINE CONTROL UNIT FOR COMPRESSION IGNITION INTERNAL COMBUSTION ENGINE

BACKGROUND OF THE INVENTION

1. Field of the Invention

This invention relates to a control system and method and an engine control unit for a compression ignition internal combustion engine, for causing a mixture supplied to the engine to burn within a combustion chamber by self-ignition.

2. Prior Art

Conventionally, this kind of control system for a compression ignition internal combustion engine has been proposed e.g. in Japanese Laid-Open Patent Publication (Kokai) No. 10-266878. In this control system, low-load to intermediate-load operating regions of the engine are set to a region for executing compression ignition. Further, the timing for opening and closing intake valves and exhaust valves is configured to be variable. When load on the engine is in the region for executing compression ignition, the timing for opening and closing the intake valves and the exhaust valves is controlled according to the load on the engine so as to make self-ignition easy to occur. Particularly, in a low-load operating region, as the load on the engine is lower, that is, as self-ignition becomes more difficult to occur due to the reduced amount of fuel supply, the timing for closing the intake valves is advanced whereby the compression ratio of intake air is increased, and the timing for closing the exhaust valves is advanced whereby part of combustion gas is retained in the combustion chambers. This increases the temperature of a mixture supplied to the combustion chambers to place the mixture in a high temperature condition, thereby making self-ignition easy to occur.

However, according to the conventional control system for a compression ignition internal combustion engine, the increase in the compression ratio and the amount of residual combustion gas that can be retained in each combustion chamber are limited. This is because an extremely high compression ratio causes knocking, and when the amount of residual combustion gas becomes too large, it is impossible to take a sufficient amount of the mixture into the combustion chamber, which prevents a required power output from being obtained from the engine. Therefore, an increase in the mixture temperature by combustion gas is limited, and therefore, self-ignition cannot be caused on the low-load side. As a result, the region for executing the compression ignition is limited on the low-load side.

SUMMARY OF THE INVENTION

It is an object of the invention to provide a control system and method and an engine control unit for a compression ignition internal combustion engine, which are capable of expanding a region for executing compression ignition on the low-load side, while positively obtaining a required power output from the engine.

To attain the above object, according to a first aspect of the invention, there is provided a control system for a compression ignition internal combustion engine, for causing a mixture supplied to the engine to burn within a combustion chamber by self-ignition, comprising:

operating condition-detecting means for detecting operating conditions of the engine;

residual combustion gas amount-determining means for determining an amount of residual combustion gas depending on the detected operating conditions of the engine;

combustion gas retention means for retaining part of combustion gas in the combustion chamber after combustion, based on the determined amount of residual combustion gas;

supercharging means for supercharging fresh air flowing to the combustion chamber;

supercharging execution-judging means for judging, based on the detected operating conditions of the engine, whether or not the supercharging by the supercharging means should be executed so as to cause self-ignition; and supercharging control means for causing the supercharging means to supercharge the fresh air flowing to the combustion chamber when it is judged by the supercharging execution-judging means that the supercharging should be executed.

According to this control system, the amount of residual combustion gas to be retained in the combustion chamber is determined depending on the detected operating conditions of the engine, and the amount of residual combustion gas thus determined is retained in the combustion chamber. Therefore, for instance, if the amount of residual combustion gas is determined depending on required load on the engine, it is possible to retain a sufficient amount of combustion gas within the combustion chamber, thereby making it possible to sufficiently raise the temperature of the mixture to be burnt in the combustion chamber. Further, it is judged, based on the detected operating conditions of the engine, whether or not supercharging of fresh air flowing to the combustion chamber should be executed so as to cause self-ignition, and when it is judged that the supercharging should be executed, the fresh air is supercharged. As a result, to prevent fresh air supplied to the combustion chamber from becoming short e.g. due to a relatively large amount of residual combustion gas, the supercharging of fresh air is executed to cause self-ignition, whereby it is possible to positively supply an amount of fresh air required for self-ignition. Thus, it is possible to ensure the supply of the required amounts of residual combustion gas and fresh air, to cause self-ignition, depending on the operating conditions of the engine, whereby the region for executing compression ignition can be expanded on the low-load side while ensuring that the engine generates a required power output.

Preferably, the supercharging execution-judging means judges that the supercharging by the supercharging means should be executed when the determined amount of residual combustion gas is equal to or larger than a predetermined value.

According to this preferred embodiment, when the amount of residual combustion gas is equal to or larger than the predetermined value, i.e. when fresh air supplied to the combustion chamber becomes short, supercharging is carried out, and hence it is possible to ensure the supply of the required amount of fresh air for self-ignition.

Preferably, the supercharging control means sets supercharging pressure created by the supercharging means to a larger value as the determined amount of residual combustion gas is larger.

According to this preferred embodiment, the supercharging pressure for supercharging fresh air flowing to the combustion chamber is set to a larger value as the amount of residual combustion gas is larger, i.e. as the degree of shortage of fresh air supplied to the combustion chamber is higher, so that it is possible to appropriately supply an amount of fresh air required for self-ignition according to the amount of residual combustion gas.

Preferably, the operating condition-detecting means includes engine speed-detecting means for detecting engine rotational speed and accelerator opening-detecting means for detecting accelerator opening, and the supercharging execution-judging means judges whether or not the supercharging by the supercharging means should be executed, based on a map in which predetermined values of the amount of residual combustion gas are set with respect to required load on the engine dependent on the accelerator opening and the engine rotational speed, and the engine rotational speed.

Preferably, the engine includes an exhaust valve, and the combustion gas retention means retains the part of combustion gas in the combustion chamber by advancing valve-closing timing of the exhaust valve.

Preferably, the engine includes a plurality of exhaust valves, and the combustion gas retention means retains the part of combustion gas in the combustion chamber by opening at least one of the exhaust valves during an intake stroke to thereby draw exhaust gases into the combustion chamber.

To attain the above object, according to a second aspect of the invention, there is provided a method of controlling a compression ignition internal combustion engine, to cause a mixture supplied to the engine to burn within a combustion chamber by self-ignition, comprising:

a detecting step of detecting operating conditions of the engine;

a determining step of determining an amount of residual combustion gas depending on the detected operating conditions of the engine;

a retaining step of retaining part of combustion gas in the combustion chamber after combustion, based on the determined amount of residual combustion gas;

a judging step of judging, based on the detected operating conditions of the engine, whether or not supercharging of fresh air flowing to the combustion chamber should be executed so as to cause self-ignition; and a control step of providing control such that the supercharging is executed when it is judged in the judging step that the supercharging should be executed.

According to this method of controlling a compression ignition internal combustion engine, the same advantageous effects as provided by the first embodiment of the present invention can be obtained.

Preferably, the judging step includes judging that the supercharging should be executed when the determined amount of residual combustion gas is equal to or larger than a predetermined value.

Preferably, the control step includes setting supercharging pressure to a larger value as the determined amount of residual combustion gas is larger.

Preferably, the detecting step includes detecting engine rotational speed and accelerator opening, and the judging step includes judging whether or not the supercharging should be executed, based on a map in which predetermined values of the amount of residual combustion gas are set with respect to required load on the engine dependent on the accelerator opening and the engine rotational speed, and the engine rotational speed.

Preferably, the engine includes an exhaust valve, and the retention step includes retaining the part of combustion gas in the combustion chamber by advancing valve-closing timing of the exhaust valve.

Preferably, the engine includes a plurality of exhaust valves, and the retention step includes retaining the part of combustion gas in the combustion chamber by opening at least one of the exhaust valves during an intake stroke to thereby draw exhaust gases into the combustion chamber.

According to the above preferred embodiments of the second aspect of the invention, the same advantageous effects as provided by respective corresponding ones of the preferred embodiments of the first aspect of the invention can be obtained.

To attain the above object, according to a third aspect of the invention, there is provided an engine control unit including a control program for causing a computer to control a compression ignition internal combustion engine, to cause a mixture supplied to the engine to burn within a combustion chamber by self-ignition, wherein the control program causes the computer to detect operating conditions of the engine, determine an amount of residual combustion gas depending on the detected operating conditions of the engine, cause part of combustion gas to be retained in the combustion chamber after combustion, based on the determined amount of residual combustion gas, judge, based on the detected operating conditions of the engine, whether or not supercharging of fresh air flowing to the combustion chamber should be executed so as to cause self-ignition, and provide control such that the supercharging is executed when it is judged that the supercharging should be executed.

According to this engine control unit, the same advantageous effects as provided by the first embodiment of the present invention can be obtained.

Preferably, when the control program causes the computer to judge whether or not the supercharging should be executed, the control program causes the computer to judge that the supercharging should be executed when the determined amount of residual combustion gas is equal to or larger than a predetermined value.

Preferably, when the control program causes the computer to provide control such that the supercharging is executed, the control program causes the computer to set supercharging pressure to a larger value as the determined amount of residual combustion gas is larger.

Preferably, when the control program causes the computer to detect operating conditions of the engine, the control program causes the computer to detect engine rotational speed and accelerator opening, and the control program causes the computer to judge whether or not the supercharging should be executed, based on a map in which predetermined values of the amount of residual combustion gas are set with respect to required load on the engine dependent on the accelerator opening and the engine rotational speed, and the engine rotational speed.

Preferably, the engine includes an exhaust valve, and the control program causes the computer to cause the part of combustion gas to be retained in the combustion chamber by advancing valve-closing timing of the exhaust valve.

Preferably, the engine includes a plurality of exhaust valves, and the control program causes the computer to cause the part of combustion gas to be retained in the combustion chamber by opening at least one of the exhaust valves during an intake stroke to thereby draw exhaust gases into the combustion chamber.

According to the above preferred embodiments of the third aspect of the invention, the same advantageous effects as provided by respective corresponding ones of the preferred embodiments of the first aspect of the invention can be obtained.

The above and other objects, features, and advantages of the invention will become more apparent from the following detailed description taken in conjunction with the accompanying drawings.

DESCRIPTION OF THE PREFERRED EMBODIMENTS

Figure 1:
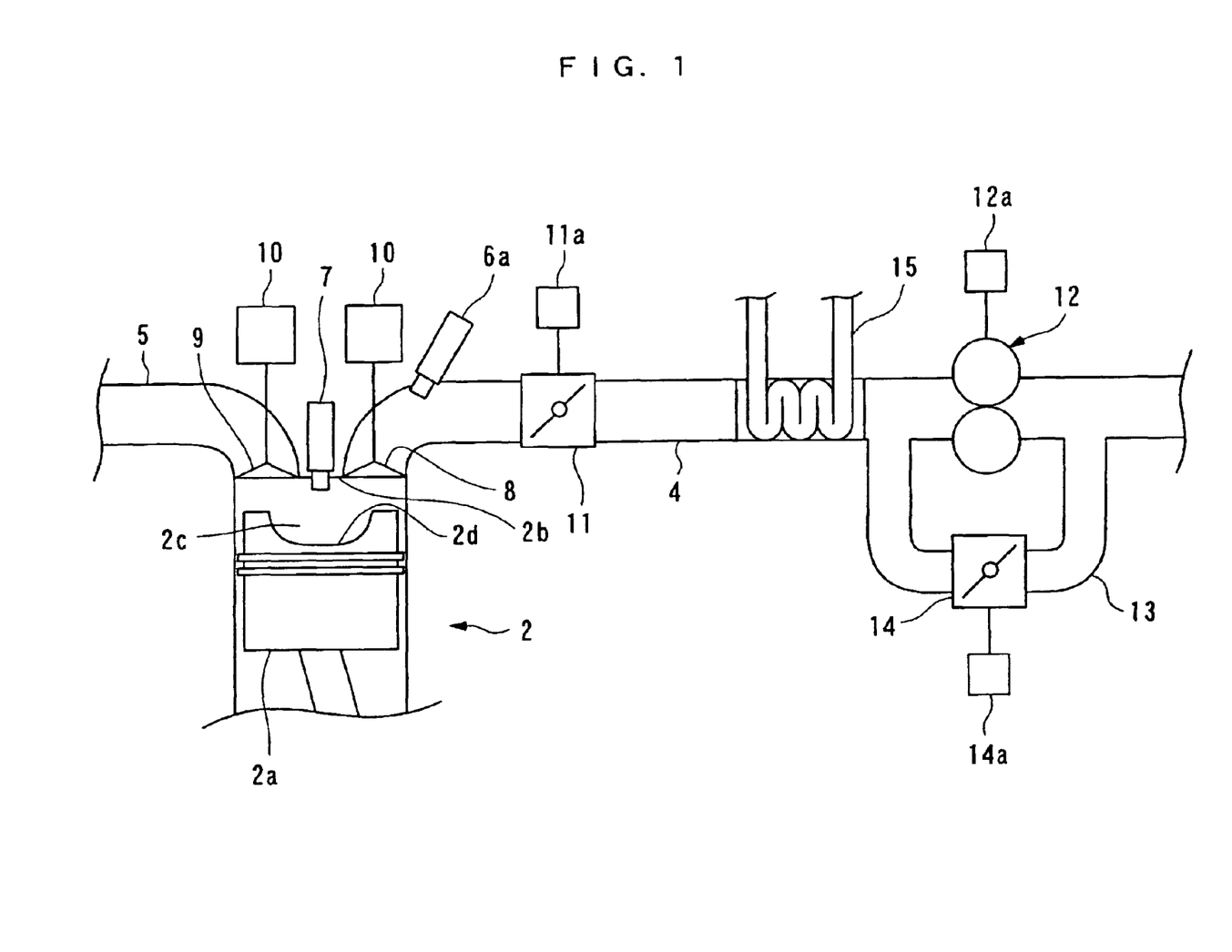
FIG. 1 is a diagram schematically showing the arrangement of a compression ignition internal combustion engine to which the present invention is applied.
Figure 2:
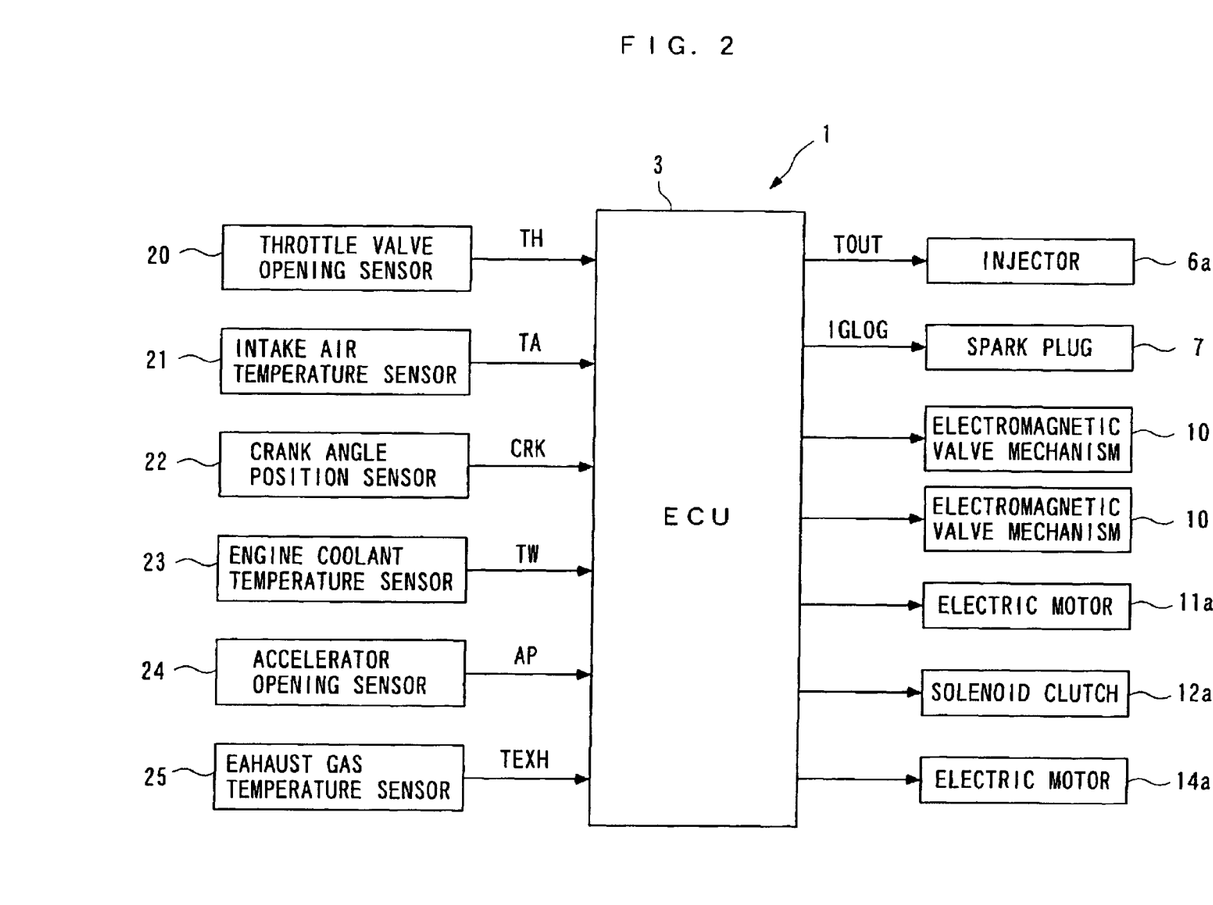
FIG. 2 is a block diagram schematically showing the arrangement of a control system according to a first embodiment of the present invention.

The invention will now be described in detail with reference to the drawings showing preferred embodiments thereof. Referring first to FIG. 1, there is schematically shown the arrangement of a compression ignition internal combustion engine (hereinafter simply referred to as "the engine" 2 to which is applied a control system 1 according to a first embodiment of the present invention. FIG. 2 schematically shows the arrangement of the control system 1.

The engine 2 is a straight type four-cylinder gasoline engine, for instance. The engine 2 has four cylinders (only one of which is shown) in each of which a combustion chamber 2c is formed between a piston 2a and a cylinder head 2b. The piston 2a has a central portion of a top surface thereof formed with a recess 2d. The cylinder head 2b has an intake pipe 4 and an exhaust pipe 5 extending therefrom as well as a spark plug 7 inserted therein in a manner facing the combustion chamber 2c. The intake pipe 4 has an injector 6a inserted therein in a manner directed toward the recess 2d of the piston 2a. The injector 6a is connected to a fuel pump, not shown, and the fuel injection period TOUT thereof is controlled by an ECU 3, referred to hereinafter. Further, the spark plug 7 has a high voltage applied thereto in timing corresponding to an ignition timing IGLOG by a drive signal from the ECU 3, and subsequent interruption of the application of the high voltage causes a spark discharge to ignite the air-fuel mixture within the cylinder. The engine 2 is capable of carrying out spark ignition combustion (hereinafter referred to as "the SI combustion") in which the mixture within the combustion chamber 2c is ignited by a spark of the spark plug 7, and compression ignition combustion (hereinafter referred to as "the CI combustion") in which the mixture within the combustion chamber 2c is ignited by self-ignition.

An intake valve 8 and an exhaust valve 9 for each cylinder are actuated by electromagnetic valve mechanisms 10 (combustion gas retention means), respectively. Each of the electromagnetic valve mechanisms 10 includes two electromagnets, not shown. Timing of energization and deenergization of the electromagnets is controlled by drive signals from the ECU 3, whereby the intake valve 8 and the exhaust valve 9 are actuated such that they are opened and closed in timing (valve timing) controlled as desired. Further, by providing control such that the valve-closing timing of the exhaust valve 9 is advanced than usual, it is possible to cause combustion gas to be retained in the combustion chamber 2c (hereinafter, this operation is referred to as "the internal EGR") and further control the amount of residual combustion gas, that is, the internal EGR rate.

The intake pipe 4 has a throttle valve 11 arranged therein. The throttle valve 11 is connected to an electric motor 11a which is implemented e.g. by a DC motor. The duty factor of a drive current supplied to the electric motor 11a is controlled by the ECU 3, whereby the degree of opening (hereinafter referred to as "the throttle valve opening") TH of the throttle valve 11 is controlled.

The throttle valve opening TH is detected by a throttle valve opening sensor 20. Further, the intake pipe 4 has an intake air temperature sensor 21 inserted therein at a location downstream of the throttle valve 11, for sensing the temperature TA of air taken into the intake pipe 4 (hereinafter referred to as "the intake air temperature"). Electric signals indicative of the sensed throttle valve opening TH and intake air temperature TA are delivered to the ECU 3.

The intake pipe 4 has a supercharger 12 (supercharging means) arranged therein at a location upstream of the throttle valve 11. The supercharger 12 includes a rotor, not shown, and a solenoid clutch 12a. The rotor is connected to a crankshaft, not shown, of the engine 2 via the solenoid clutch 12a. The solenoid clutch 12a is for connecting/disconnecting between the rotor and the crankshaft. The operation of the solenoid clutch 12a is controlled by the ECU 3. Due to this construction, when the solenoid clutch 12a is engaged, the rotor is driven by the crankshaft, whereby fresh air is supercharged into the combustion chamber 2c.

Further, the intake pipe 4 includes a bypass passage 13 bypassing the supercharger 12. The bypass passage 13 has a bypass valve 14 arranged thereacross. The bypass valve 14 is connected to an electric motor 14a implemented e.g. by a DC motor. The duty factor of a drive current supplied to the electric motor 14a is controlled by the ECU 3, whereby the degree of opening (hereinafter referred to as "the bypass valve opening") BPV of the bypass valve 14 is controlled. By controlling the bypass valve opening BPV, supercharging pressure created by the supercharger 12 is controlled.

Further, the intake pipe 4 has an intercooler 15 arranged therein at a location downstream of the supercharger 12. The intercooler 15 is of a water cooling type, and operated for cooling fresh air whose temperature is made high by being compressed by the supercharger 12.

The ECU 3 receives a CRK signal from a crank angle position sensor 22 (operating condition-detecting means). The CRK signal is a pulse signal delivered from the crank angle position sensor 22 in accordance with rotation of the crankshaft of the engine 2 whenever the crankshaft rotates through a predetermined angle. The ECU 3 determines an engine rotational speed NE based on the CRK signal. Further, the ECU 3 receives a detection signal indicative of the temperature TW of coolant of the engine 2 (hereinafter referred to as "the engine coolant temperature") from an engine coolant temperature sensor 23, a detection signal indicative of the degree of opening or stepped-on amount AP of an accelerator pedal, not shown, (hereinafter referred to as "the accelerator opening") from an accelerator opening sensor 24, and a detection signal indicative of the temperature TEXH of exhaust gases flowing through the exhaust pipe 5 (hereinafter referred to as "the exhaust gas temperature"), from an exhaust gas temperature sensor 25, respectively.

In the present embodiment, the ECU 3 forms the operating condition-detecting means, residual combustion gas amount-determining means, supercharging execution-judging means, and supercharging control means, and is implemented by a microcomputer comprised of an I/O interface, a CPU, a RAM, and a ROM, none of which are specifically shown. The signals from the above sensors 20 to 25 are each input to the CPU after A/D conversion and waveform shaping by the I/O interface.

The CPU determines operating conditions of the engine 2 based on these input signals. Then, in dependence on the determined operating conditions, the CPU determines which of the SI combustion and the CI combustion should be carried out by the engine 2, according to a control program and data read from the ROM, data read from the RAM, etc. and executes a control process for controlling the engine 2 according to the result of the determination.

Figure 3:
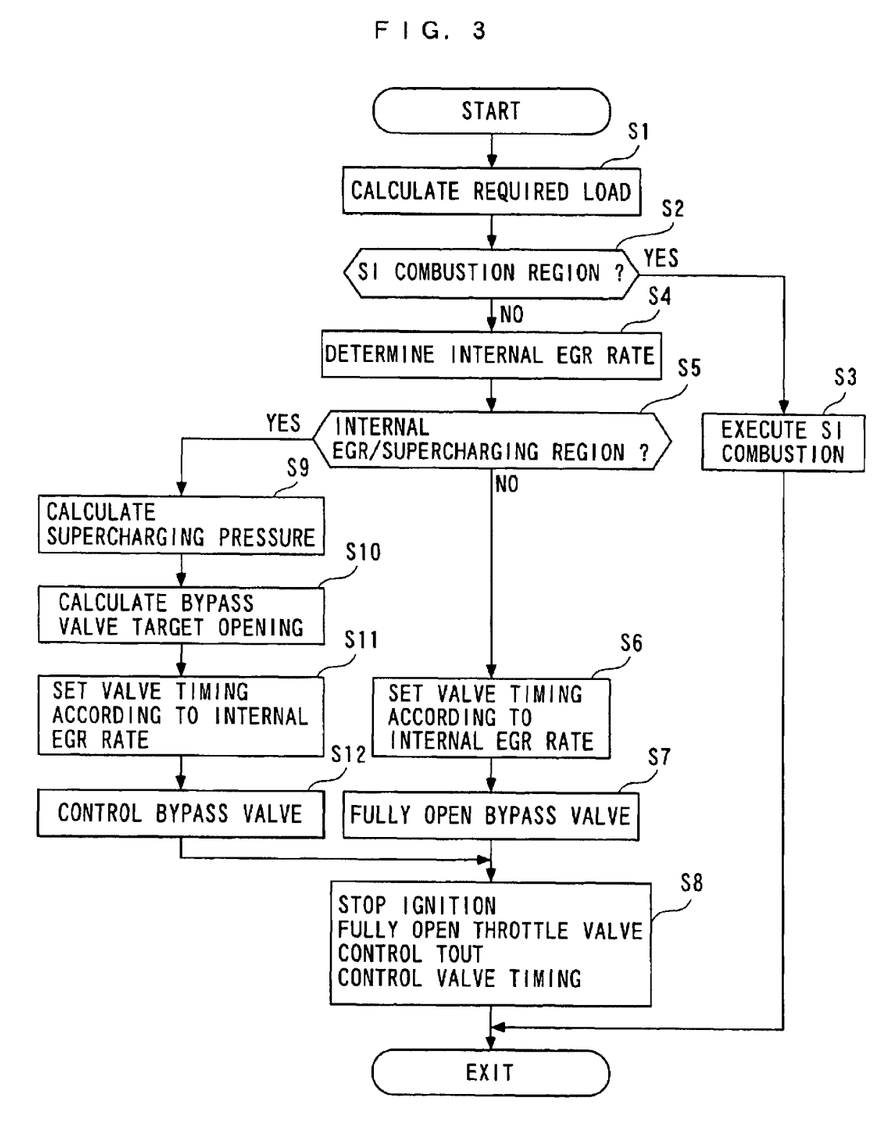
FIG. 3 is a flowchart of a control process for controlling the compression ignition internal combustion engine.
Figure 4:
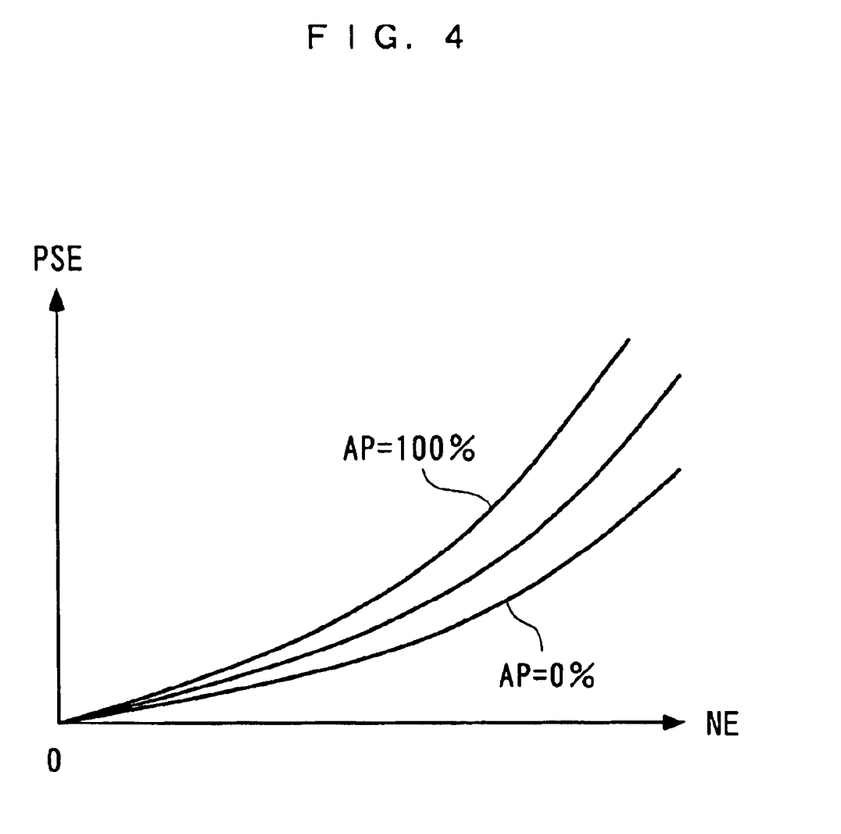
FIG. 4 is a diagram showing an example of a PSE table used in the FIG. 3 control process.

FIG. 3 is a flowchart of the above control process. First, in a step S1, a required load TE on the engine 2 is calculated by using the engine rotational speed NE and so forth by the following equation (1):

$$TE = CONST \cdot PSE/NE \quad (1)$$

wherein CONST represents a constant, and PSE represents a required power output of the engine 2. The required power output PSE is set by looking up a PSE table shown in FIG. 4 according to the accelerator opening AP and the engine rotational speed NE. The PSE table is formed by a plurality of tables set respectively for predetermined values of the accelerator opening AP within a range between 0 to 100%. When the accelerator opening AP indicates an intermediate value between two of the predetermined values of the accelerator opening AP, the required power output PSE is calculated by interpolation. Further, in the above tables, the required power output PSE is set to a larger value, as the engine rotational speed NE is larger and the accelerator opening AP is larger.

Then, it is determined in a step S2 whether or not the engine 2 is in an operating region (hereinafter referred to as "the SI combustion region") in which the SI combustion should be carried out. This determination is performed based on an operating region determination map shown in FIG. 5, according to the required load TE and the engine rotational speed NE. In the operating region determination map, as shown by solid lines in FIG. 5, a region in which the required load TE is low to medium and at the same time the engine rotational speed NE is low to medium is defined as an operating region in which the CI combustion should be carried out (hereinafter referred to as "the CI combustion region"), and the other region is set to the SI combustion region.

Figure 5:
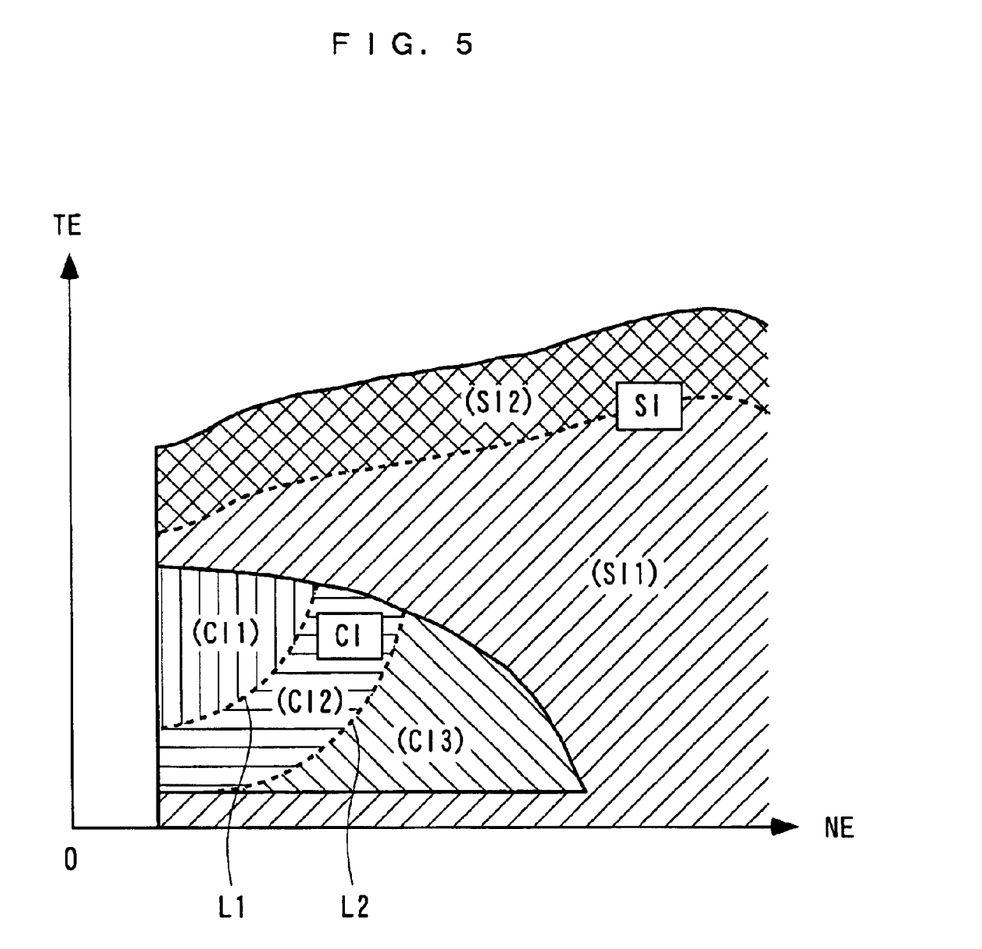
FIG. 5 is a diagram showing an example of an operating region determination map used in the FIG. 3 control process.

More specifically, the CI combustion region is divided by boundaries L1 and L2 into a non-internal EGR region CI1 where the required load TE is medium and at the same time the engine rotational speed NE is low, and therefore no combustion gas is retained, that is, the internal EGR is not performed, an internal EGR region CI2 where the required load TE is low to medium and at the same time the engine rotational speed NE is low to medium, and therefore the internal EGR is performed, and an internal EGR/supercharging region CI3 where the required load TE is low to medium and at the same time the engine rotational speed NE is medium, and therefore the internal EGR is performed and at the same time supercharging is performed. Further, the SI combustion region is divided into a supercharging region SI2 where the required load TE is high and supercharging is performed, and a non-supercharging region SI1 other than the supercharging region SI2, where supercharging is not performed.

If the answer to the question of the step S2 is affirmative (YES), i.e. if the engine 2 is in the SI combustion region, the SI combustion is carried out in a step S3. More specifically, the ignition timing IGLOG, the throttle valve opening TH, the air-fuel ratio of the mixture supplied to the engine 2, and so forth are controlled according to the required load TE and the engine rotational speed NE. Further, if the engine 2 is in the supercharging region SI2 of the SI combustion region, supercharging is performed by engaging the solenoid clutch 12a of the supercharger 12.

If the answer to the question of the step S2 is negative (NO), i.e. if the engine 2 is in the CI combustion region, the internal EGR rate is determined in a step S4. The internal EGR rate is determined based on an EGR map shown in FIG. 6, according to the required load TE and the engine rotational speed NE.

Figure 6:
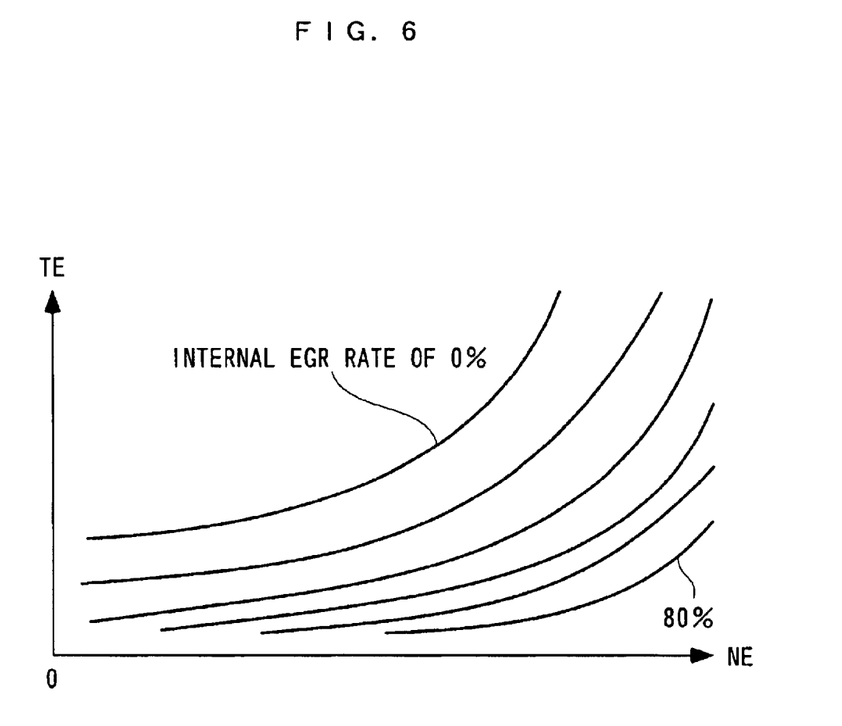
FIG. 6 is a diagram showing an example of an EGR table used in the FIG. 3 control process.

In the EGR map, there are defined curves respectively representing predetermined internal EGR rates of 0 to 80% and each formed by connecting points where the same internal EGR rate is set with respect to the required load TE and the engine rotational speed NE. Further, the EGR map is configured such that the internal EGR rate is set to a larger value as the required load TE is smaller and as the engine rotational speed NE is larger. This configuration of the EGR map is made for the following reasons: As the required load TE becomes smaller, the amount of fuel supply becomes smaller, which makes self-ignition difficult to be caused. To overcome this problem, by setting the EGR map value to a larger value, the internal EGR rate is increased to raise the temperature of the mixture in the combustion chamber 2c. Further, as the engine rotational speed NE becomes larger, time for combustion of the mixture becomes shorter, so that sufficient time cannot be allocated for self-ignition. This makes it difficult to cause self-ignition, so that to compensate for the shortage of time, by setting EGR map value to a larger value, the internal EGR rate is increased to raise the temperature of the mixture in the combustion chamber 2c. It should be noted that if a point representative of the required load TE and the engine rotational speed NE is not on any of the above curves defined in the EGR map, the internal EGR rate is determined by interpolation. Further, in a region where the required load TE is higher and at the same time the engine rotational speed NE is lower than a curve representative of an internal EGR rate of 0%, the internal EGR rate is determined to be equal to a value of 0. In other words, the curve representative of an internal EGR rate of 0% corresponds to the boundary L1 between the non-internal EGR region CI1 and the internal EGR region CI2 in FIG. 5.

Next, it is determined in a step S5 whether or not the engine 2 is in the internal EGR/supercharging region CI3 of the operating region determination map in FIG. 5. If the answer to the question of the step S5 is negative (NO), i.e. if the engine 2 is not in the internal EGR/supercharging region CI3, in the following step S6, the valve timing of the intake valves 8 and the exhaust valves 9 is set according to the internal EGR rate determined in the step S4.

Figure 7:
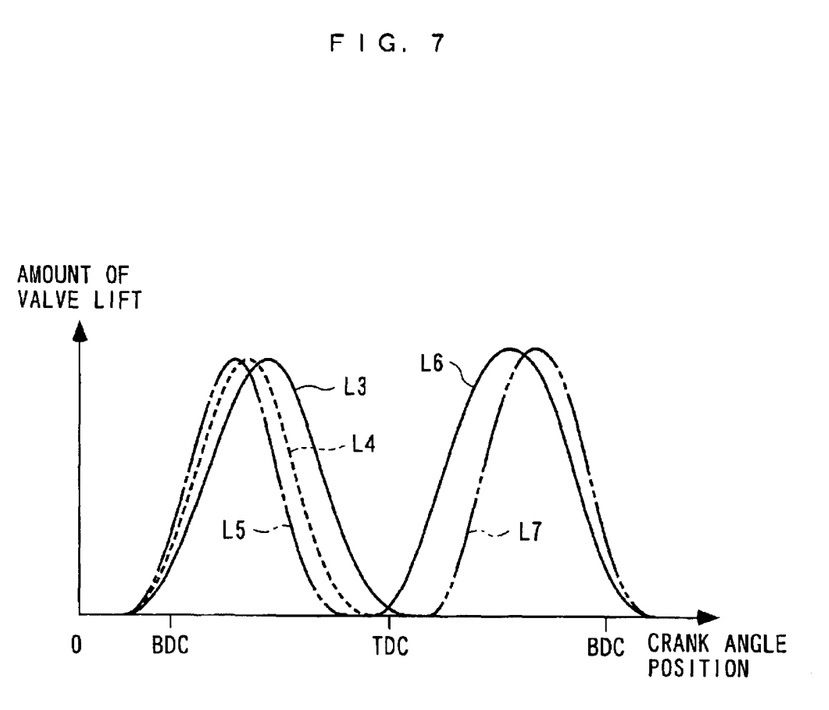
FIG. 7 is a diagram showing an example of valve lift curves used in the FIG. 3 control process.

FIG. 7 shows valve lift curves formed based on an example of the above configurations of the valve timing. More specifically, the valve-opening timing of each exhaust valve 9 is set to a crank angle position immediately before the bottom dead center position, unconditionally or irrespective of whether or not the internal EGR is performed. When the internal EGR is not performed (the internal EGR rate=0), the valve-closing timing of the exhaust valve 9 is set to a crank angle position immediately after the top dead center position (curve L3), whereas when the internal EGR is performed, the valve-closing timing of the exhaust valve 9 is set to crank angle positions earlier than the top dead center position (curves L4 and L5) as the internal EGR rate is larger. As for each intake valve 8, when the internal EGR is not performed, the valve-opening timing of the intake valve 8 is set to a crank angle position immediately before the top dead center position (curve L6), whereas when the internal EGR is performed, the valve-opening timing of the intake valve 8 is set to a predetermined crank angle position after the top dead center position (curve L7), irrespective of the internal EGR rate. Further, the valve-closing timing of the intake valve 8 is set to a crank angle position immediately after the bottom dead center position, unconditionally or irrespective of whether or not the internal EGR is performed.

In the following step S7, the bypass valve opening BPV is controlled to be fully open so as to inhibit the supercharger 12 from performing supercharging. Then, in a step S8, to execute the CI combustion, ignition by the spark plug 7 is stopped, and the throttle valve opening TH is controlled to be fully open, while controlling the fuel injection period TOUT, and also controlling the intake valves 8 and the exhaust valves 9 by the valve timing set in the step S6, followed by terminating the present program.

Figure 8:
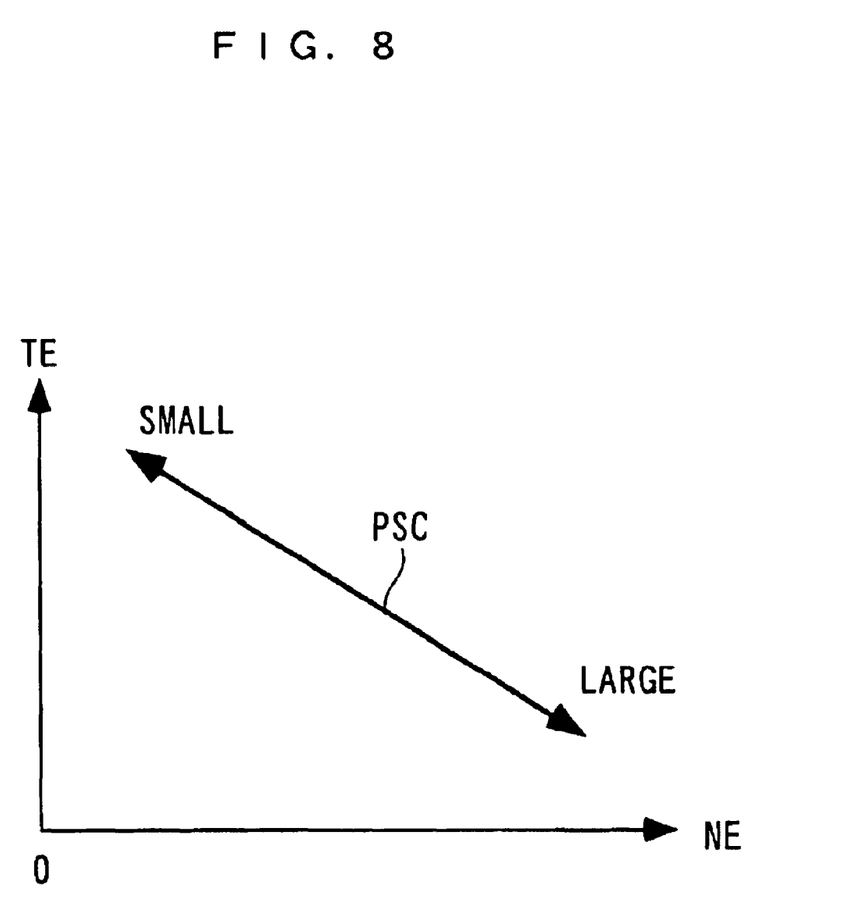
FIG. 8 is a diagram showing an example of a PSC calculation map used in the FIG. 3 control process.

If the answer to the question of the step S5 is affirmative (YES), i.e. if the engine 2 is in the internal EGR/supercharging region CI3, in a step S9, supercharging pressure PSC is calculated based on a PSC calculation map shown in FIG. 8, according to the required load TE and the engine rotational speed NE. In the PSC calculation map, the supercharging pressure PSC is set to a larger value as the required load TE is smaller and as the engine rotational speed NE is larger. As a result, the supercharging pressure PSC is set to a larger value as the internal EGR rate is larger.

Then, in a step S10, a target opening degree (target opening) BOBJ of the bypass valve 14 is retrieved from a BOBJ table, not shown, according to the supercharging pressure PSC calculated in the step S9. In the BOBJ table, the target opening BOBJ is set to a smaller value as the supercharging pressure PSC is larger.

In a step S11 following the step S10, similarly to the case of the step S6, the valve timing of the intake valves 8 and the exhaust valves 9 is set according to the internal EGR rate determined in the step S4.

Next, in a step S12, to carry out supercharging by the supercharger 12, the solenoid clutch 12a is engaged, and the bypass valve opening BPV is controlled such that it becomes equal to the target opening BOBJ calculated in the step S10. Then, the program proceeds to the above step S8, wherein to execute the CI combustion, the application of a voltage to the spark plug 7 is stopped, and the throttle valve opening TH is controlled to be fully open, while controlling the fuel injection period TOUT, and also controlling the intake valves 8 and the exhaust valves 9 by the valve timing set in the step S11, followed by terminating the program.

As described hereinabove, according to the control system 1 for the compression ignition internal combustion engine of the present embodiment, the internal EGR rate is determined such that it becomes larger as the required load TE is smaller and as the engine rotational speed NE is larger. Therefore, it is possible to raise the temperature of the mixture in the combustion chamber 2c high enough according to the required load TE and the engine rotational speed NE. Further, when the required load TE is lower and at the same time the engine rotational speed NE is higher than the boundary L2, in other words, when fresh air supplied to the combustion chamber 2c becomes short due to a high internal EGR rate, supercharging is carried out (compressed fresh air is supplied to the combustion chambers). This positively ensures the supply of an amount of fresh air required for self-ignition. Further, since the supercharging pressure PSC is set to a larger value as the internal EGR rate is larger, i.e. as the degree of shortage of fresh air is higher, it is possible to supply an appropriate amount of fresh air required for self-ignition according to the internal EGR rate. The above-described characterizing features of the control system 1 according to the present embodiment make it possible to expand the region for executing compression ignition, on the low-load side, while positively obtaining a required power output from the engine 2.

Figure 9:
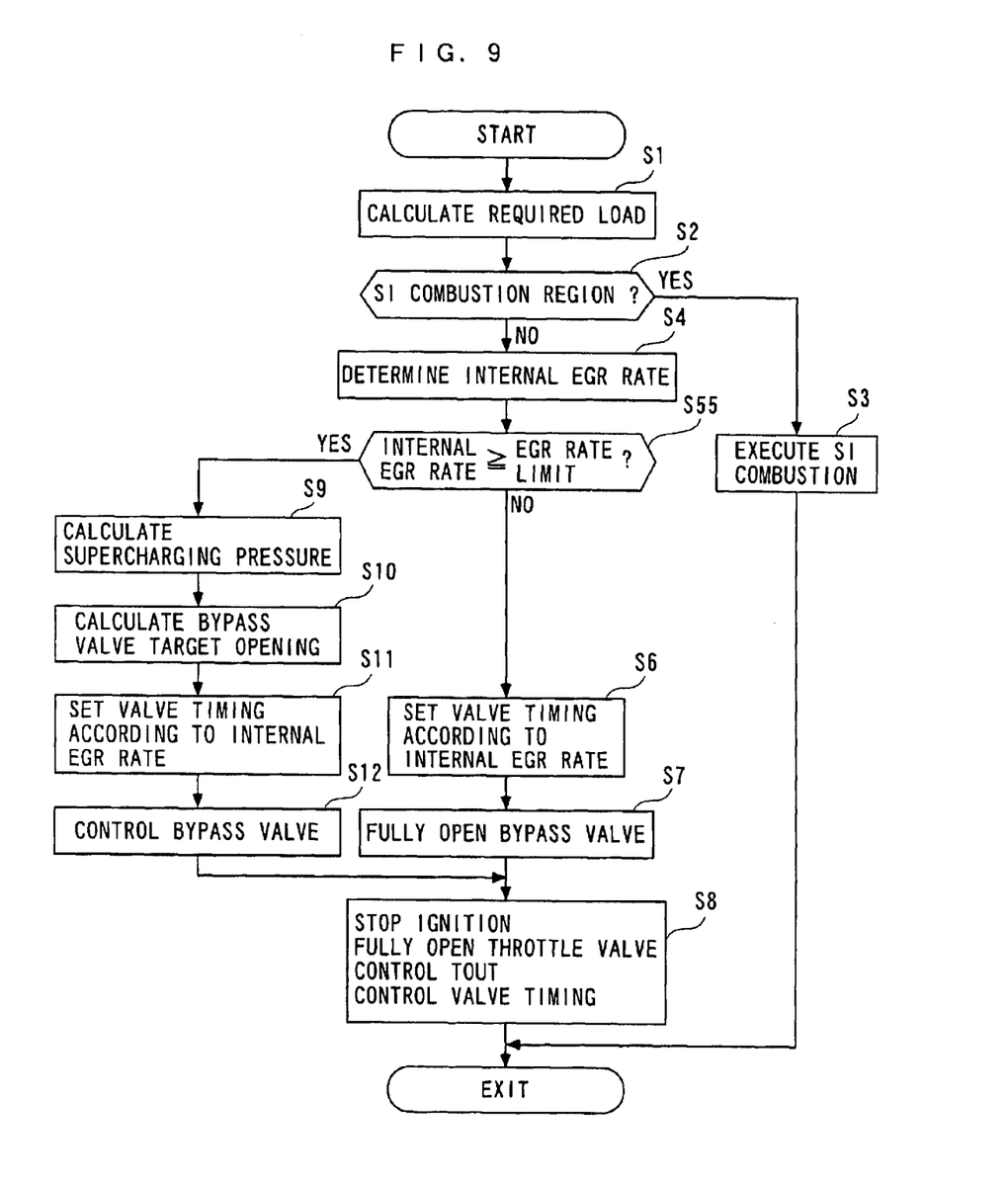
FIG. 9 is a flowchart of a control process carried out by a control system according to a second embodiment of the present invention, for controlling a compression ignition internal combustion engine.

FIG. 9 shows a flowchart of a control process executed by a control system for a compression ignition internal combustion engine, according to a second embodiment of the invention. As is apparent from comparison of FIG. 9 with FIG. 3, the present embodiment is distinguished from the first embodiment only by a process carried out in a step S55 in FIG. 9.

More specifically, in the step S55, it is determined whether or not the internal EGR rate determined in the step S4 is equal to or larger than an EGR rate limit. If the answer to the question is affirmative (YES), i.e. if the internal EGR rate≧the EGR rate limit holds, the program proceeds to the step S9 et. seq., wherein supercharging is carried out by the supercharger 12. On the other hand, if the answer to the question is negative (NO), i.e. if the internal EGR rate<the EGR rate limit holds, the program proceeds to the step S6 et. seq., wherein supercharging is inhibited. The EGR rate limit means a limit value of the internal EGR rate beyond which it is impossible to supply a required amount of fresh air for self-ignition by natural intake air alone, due to too large an internal EGR rate. The EGR rate limit may be set to a fixed predetermined value (e.g. 30%). Alternatively, values dependent on the required load TE and the engine rotational speed NE may be empirically set to the EGR rate limit through experiments.

As described hereinbefore, similarly to the first embodiment, in the present embodiment as well, when it is expected that the supply of fresh air to the combustion chambers 2c becomes short due to too large an internal EGR rate, it is possible to positively supply the required amount of fresh air for self-ignition, by supercharging the engine, i.e. supplying compressed fresh air to the combustion chambers.

Figure 10:
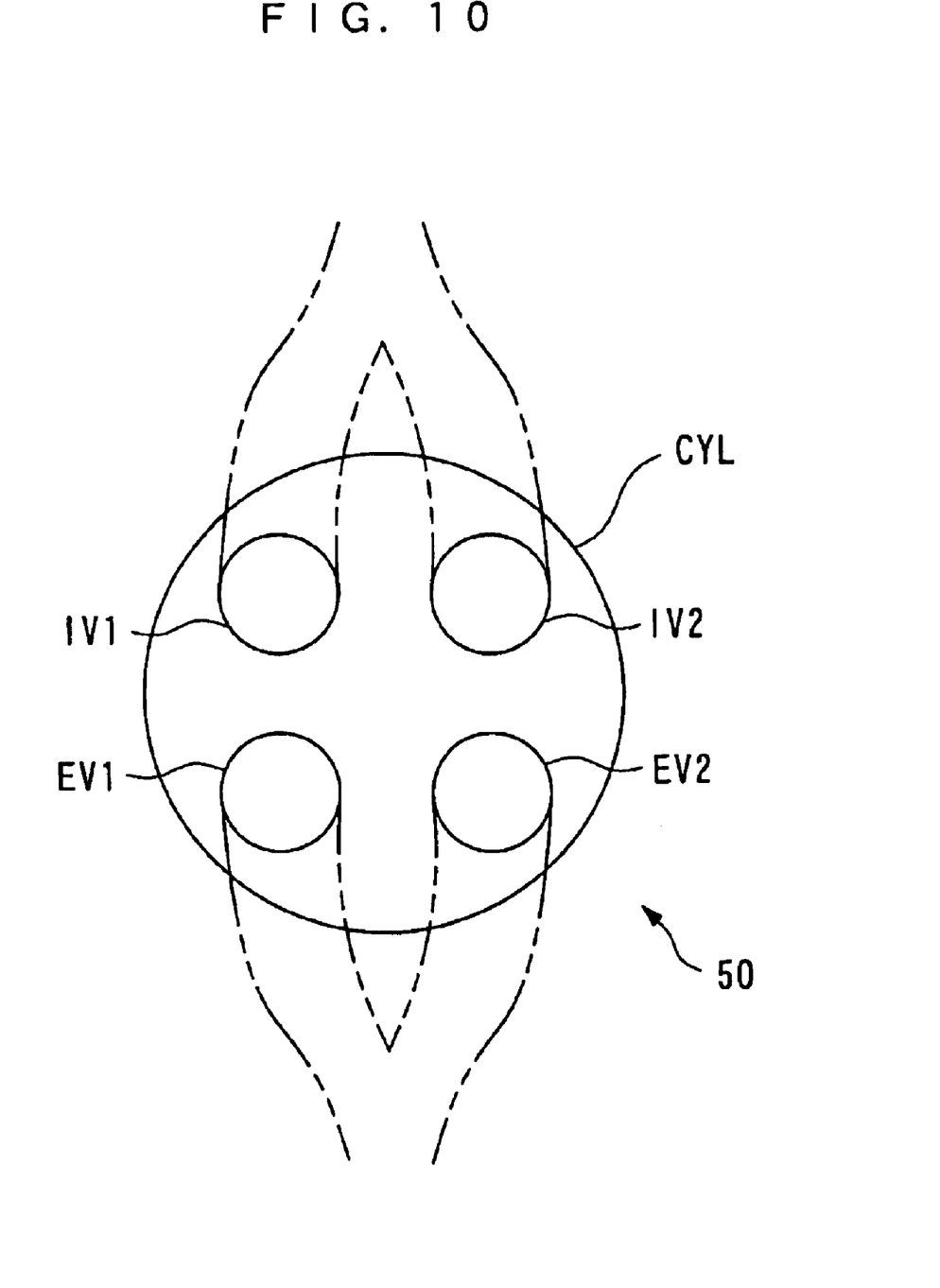
FIG. 10 is a diagram schematically showing the arrangement of intake valves and exhaust valves of a compression ignition internal combustion engine to which is applied a control system according to a third embodiment of the present invention.
Figure 11:
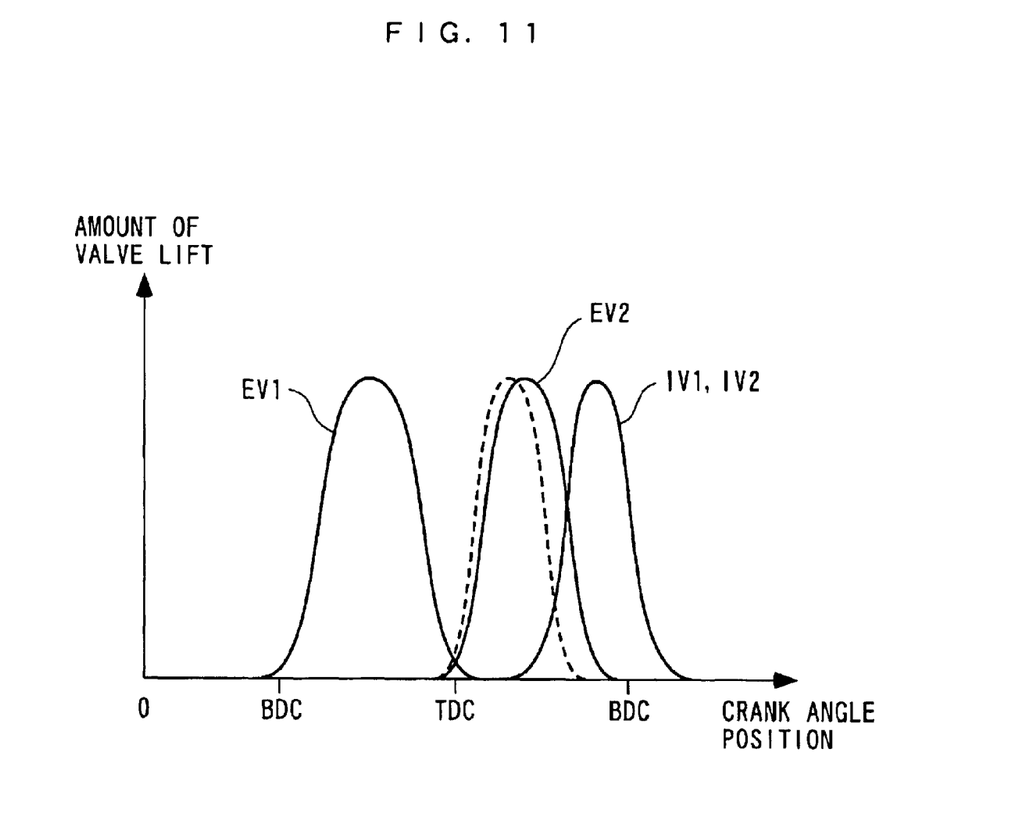
FIG. 11 is a diagram showing an example of valve lift curves of the intake and exhaust valves shown in FIG. 10.

FIGS. 10 and 11 show a third embodiment of the invention. Referring to FIG. 10, a compression ignition internal combustion engine (hereinafter simply referred to as "the engine") 50 has cylinders CYL each provided with two intake valves, i.e. first and second intake valves IV1, IV2, and two exhaust valves, i.e. first and second exhaust valves EV1, EV2. The internal EGR rate is controlled by changing the valve timing of the second exhaust valve EV2.

FIG. 11 shows an example of valve lift curves of the above intake and exhaust valves of a cylinder. More specifically, the valve-opening timing of the first exhaust valve EV1 is set to a crank angle position immediately before the bottom dead center position of the cylinder, and the valve-closing timing thereof is set to a crank angle position immediately after the top dead center position. The valve-opening timing of the second exhaust valve EV2 is set to a crank angle position immediately before the above top dead center position, and the valve-closing timing thereof is set to a crank angle position immediately before the bottom dead center position after the above top dead center position. Further, the valve-opening timing of the first and second intake valves IV1, IV2 is set to a predetermined crank angle position after the top dead center position, and the valve-closing timing thereof is set to a crank angle position after the bottom dead center position. As described above, the second exhaust valve EV2 is opened between the closing of the first exhaust valve EV1 and the opening of the first and second intake valves IV1, IV2, whereby combustion gas once exhausted through the first exhaust valve EV1 can be returned to the combustion chamber as internal EGR, and the internal EGR rate can be controlled by changing a valve-opening time period, i.e. the valve-closing timing of the second exhaust valve EV2 as exemplified by a broken line. As a result, if the valve timing of the second exhaust valve EV2 is controlled according to the determined internal EGR rate, it is possible to obtain the same advantageous effects as provided by the first embodiment.

It should be noted that the present invention is not necessarily limited to the embodiments described above, but can be practiced in various forms. For example, although in the above embodiments, the internal EGR rate is variably controlled by changing the valve timing of the intake and exhaust valves 8, 9 by the electromagnetic valve mechanisms 10, this is not limitative, but the same may be controlled by changing the amount of valve lift of the intake and exhaust valves 8, 9. Further, although in the above embodiments, the supercharger 12 is employed as supercharging means, this is not limitative, but a turbocharger may be used. Furthermore, although in the above embodiments, the required load TE and the engine rotational speed NE are employed as parameters indicative of operating conditions of the engine 2, for calculating the internal EGR rate, of course, other suitable parameters may be used. Further, the present invention can be applied to a ship propulsion engine, such as an outboard engine, which has a crankshaft vertically disposed therein.

It is further understood by those skilled in the art that the foregoing are preferred embodiments of the invention, and that various changes and modification may be made without departing from the spirit and scope thereof.

What is claimed is:

1. A control system for a compression ignition internal combustion engine, for causing a mixture supplied to the engine to burn within a combustion chamber by self-ignition, comprising:
    operating condition-detecting means for detecting operating conditions of the engine;
    residual combustion gas amount-determining means for determining an amount of residual combustion gas depending on the detected operating conditions of the engine;
    combustion gas retention means for retaining part of combustion gas in the combustion chamber after combustion, based on the determined amount of residual combustion gas;
    supercharging means for supercharging fresh air flowing to the combustion chamber;
    supercharging execution-judging means for judging, based on the detected operating conditions of the engine, whether or not the supercharging by said supercharging means should be executed so as to cause self-ignition; and
    supercharging control means for causing said supercharging means to supercharge the fresh air flowing to the combustion chamber when it is judged by said supercharging execution-judging means that the supercharging should be executed.

2. A control system according to claim 1, wherein said supercharging execution-judging means judges that the supercharging by said supercharging means should be executed when the determined amount of residual combustion gas is equal to or larger than a predetermined value.

3. A control system according to claim 1, wherein said supercharging control means sets supercharging pressure created by said supercharging means to a larger value as the determined amount of residual combustion gas is larger.

4. A control system according to claim 1, wherein said operating condition-detecting means includes engine speed-detecting means for detecting engine rotational speed and accelerator opening-detecting means for detecting accelerator opening, and wherein said supercharging execution-judging means judges whether or not the supercharging by said supercharging means should be executed, based on a map in which predetermined values of the amount of residual combustion gas are set with respect to required load on the engine dependent on the accelerator opening and the engine rotational speed, and the engine rotational speed.

5. A control system according to claim 1, wherein the engine includes an exhaust valve, and wherein said combustion gas retention means retains the part of combustion gas in the combustion chamber by advancing valve-closing timing of the exhaust valve.

6. A control system according to claim 1, wherein the engine includes a plurality of exhaust valves, and wherein said combustion gas retention means retains the part of combustion gas in the combustion chamber by opening at least one of the exhaust valves during an intake stroke to thereby draw exhaust gases into the combustion chamber.

7. A method of controlling a compression ignition internal combustion engine, to cause a mixture supplied to the engine to burn within a combustion chamber by self-ignition, comprising:
    a detecting step of detecting operating conditions of the engine;
    a determining step of determining an amount of residual combustion gas depending on the detected operating conditions of the engine;
    a retaining step of retaining part of combustion gas in the combustion chamber after combustion, based on the determined amount of residual combustion gas;
    a judging step of judging, based on the detected operating conditions of the engine, whether or not supercharging of fresh air flowing to the combustion chamber should be executed so as to cause self-ignition; and
    a control step of providing control such that the supercharging is executed when it is judged in said judging step that the supercharging should be executed.

8. A method according to claim 7, wherein said judging step includes judging that the supercharging should be executed when the determined amount of residual combustion gas is equal to or larger than a predetermined value.

9. A method according to claim 7, wherein said control step includes setting supercharging pressure to a larger value as the determined amount of residual combustion gas is larger.

10. A method according to claim 7, wherein said detecting step includes detecting engine rotational speed and accelerator opening, and wherein said judging step includes judging whether or not the supercharging should be executed, based on a map in which predetermined values of the amount of residual combustion gas are set with respect to required load on the engine dependent on the accelerator opening and the engine rotational speed, and the engine rotational speed.

11. A method according to claim 7, wherein the engine includes an exhaust valve, and wherein said retention step includes retaining the part of combustion gas in the combustion chamber by advancing valve-closing timing of the exhaust valve.

12. A method according to claim 7, wherein the engine includes a plurality of exhaust valves, and wherein said retention step includes retaining the part of combustion gas in the combustion chamber by opening at least one of the exhaust valves during an intake stroke to thereby draw exhaust gases into the combustion chamber.

13. An engine control unit including a control program for causing a computer to control a compression ignition internal combustion engine, to cause a mixture supplied to the engine to burn within a combustion chamber by self-ignition, wherein the control program causes the computer to detect operating conditions of the engine, determine an amount of residual combustion gas depending on the detected operation conditions of the engine, cause part of combustion gas to be retained in the combustion chamber after combustion, based on the determined amount of residual combustion gas, judge, based on the detected operating conditions of the engine, where or not supercharging of fresh air flowing to the combustion chamber should be executed so as to cause self-ignition, and provide control such that the supercharging is executed when it is judged that the supercharging should be executed.

14. An engine control unit according to claim 13, wherein when the control program causes the computer to judge whether or not the supercharging should be executed, the control program causes the computer to judge that the supercharging should be executed when the determined amount of residual combustion gas is equal to or larger than a predetermined value.

15. An engine control unit according to claim 13, wherein when the control program causes the computer to provide control such that the supercharging is executed, the control program causes the computer to set supercharging pressure to a larger value as the determined amount of residual combustion gas is larger.

* * * * *